United States Patent [19]

Weibler

[11] Patent Number: 4,825,694

[45] Date of Patent: May 2, 1989

[54] APPARATUS FOR MEASURING VELOCITY OF FLOW

[75] Inventor: Wolfgang Weibler, Hofheim, Fed. Rep. of Germany

[73] Assignee: VDO Adolf Schindling AG, Frankfurt am Main, Fed. Rep. of Germany

[21] Appl. No.: 21,298

[22] Filed: Mar. 3, 1987

[30] Foreign Application Priority Data

Mar. 3, 1986 [DE] Fed. Rep. of Germany ....... 3606849

[51] Int. Cl.$^4$ ................................................ G01F 1/68
[52] U.S. Cl. .................................................. 73/204.26
[58] Field of Search ............................. 73/204, 118.2

[56] References Cited

U.S. PATENT DOCUMENTS 4,449,402 5/1984 Eiermann ............................. 73/204
4,735,099 4/1988 Ohta et al. ........................... 73/204

Primary Examiner—Herbert Goldstein
Attorney, Agent, or Firm—Martin A. Farber

[57] ABSTRACT

In an apparatus for measuring the velocity of flow of fluids, and particularly the intake air of internal combustion engines, with an electrically heatable resistance layer which is applied in insulated manner onto a support, and is in thermal contact with the flowing fluid, a layer of low thermal conductivity is furthermore applied in such a manner that the local heat transfer coefficient between the flowing fluid and the resistance layer is at least approximately constant in the direction of flow. In this connection, the thickness of the layer can decrease continuously or stepwise in the direction of flow. A reduction in the response time is obtained. Glass or polytetrafluorethylene, among other substances, enter into consideration as material for the layer.

9 Claims, 1 Drawing Sheet

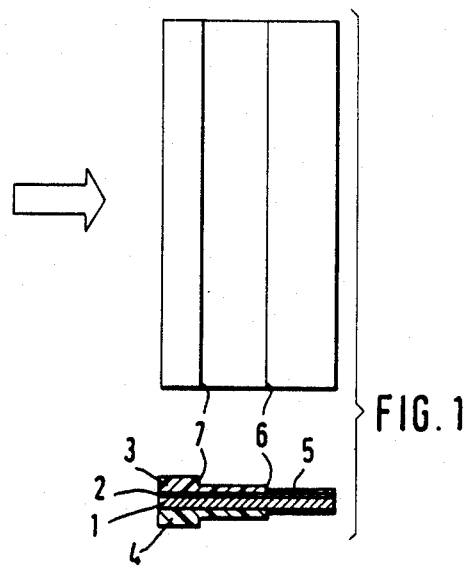
FIG. 1
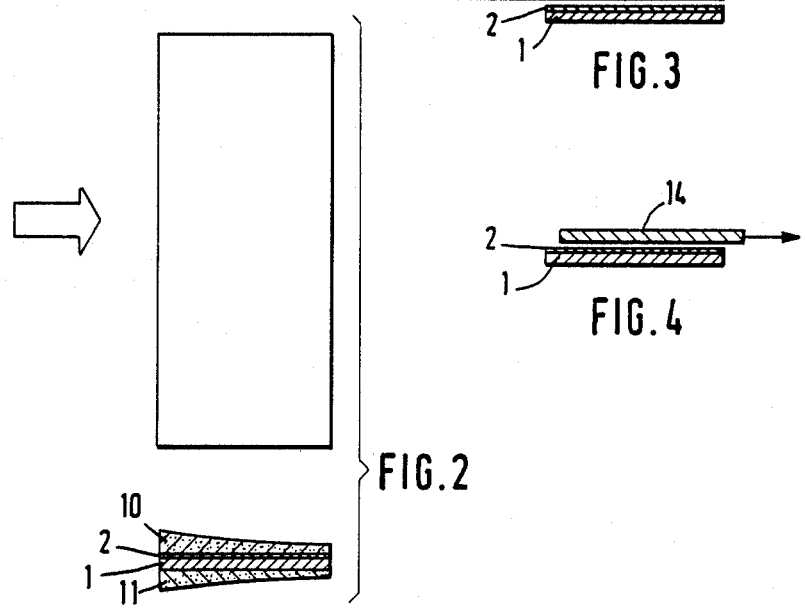
FIG. 2
FIG. 3
FIG. 4

4,825,694

APPARATUS FOR MEASURING VELOCITY OF FLOW

FIELD AND BACKGROUND OF THE INVENTION

The present invention relates to an apparatus for measuring the velocity of flow of fluids, particularly the intake air of internal-combustion engines, having an electrically heatable resistance layer which is applied in insulated manner on a support and is in thermal contact with the flowing fluid.

In known sensor elements for electrothermal air mass meters, a resistance layer which is applied to a flat support is passed through by a current, resulting in heating. Depending on the velocity of flow of the air flowing around the sensor, a greater or lesser amount of heat is removed from the resistance layer and the sensor. By the use of a resistance material with positive or negative temperature coefficient, the current can be controlled in such a manner that the temperature is a constant amount greater than the temperature of the air. The current required for this is then a measure of the velocity of flow.

One important field of use of such sensors is for the measurement of the mass of air drawn in by internal combustion engines. This measurement is particularly important in order to control the combustion process of the internal-combustion engine so as to minimize the proportion of injurious substances upon the combustion.

However, it has been found that the local heat transfer coefficient is greatest in the vicinity of that edge of the sensor which is opposite the flow of air, which coefficient decreases with increasing distance from said edge. In this way a temperature gradient is produced in the direction of flow along the resistance layer and the support, said gradient being dependent on the velocity of flow and causing a relatively slow response time of the known sensors.

In order to reduce the response time it is already known to dimension the current paths produced in the resistance layer in such a manner that the resultant electric heating output per unit of area is in a constant relationship to the local heat transfer coefficient.

SUMMARY OF THE INVENTION

It is the object of the invention to provide an improved apparatus of the introductory-mentioned type.

According to the invention, a layer of low thermal conductivity is furthermore applied in such a manner that the local heat transfer coefficient between the flowing fluid on the one hand and the resistance layer and the support on the other hand is at least approximately constant in the direction of flow. The invention has the advantage that the structure of the resistance layer need not be developed in accordance with the above-mentioned viewpoints and that the resistance layer is protected by the layer of low thermal conductivity. Furthermore, the sensor is insensitive to the deposition of dirt.

Embodiments of the apparatus of the invention are characterized by the fact that the thickness of the layer decreases continuously or stepwise in the direction of flow. These embodiments of the invention have proven particularly convenient for manufacture and can thus be produced at low cost.

Manufacture of the apparatus with stepwise decreasing thickness of layer is advantageously possible in the manner that the layer is applied by a printing process and that a plurality of partial layers are printed one above the other, the number of partial layers decreasing in the direction of flow.

Apparatus with continuous as well, however, as stepwise decrease of the thickness of layer can also be produced in the manner that a chemical or physical method of application is employed wherein a support and a mask which at least partially covers the surface of the resistance layer are moved relative to each other during the application of the layer in such a manner that partial regions of the surface are freed for different periods of time for the application of the layer. In this connection, the method of application may, depending on the material required, be a vapor-deposition method which is carried out at atmospheric pressure under an inert gas, or in a vacuum.

The locally dependent thickness of layer can also be obtained in the manner that the mask has a slit which extends transversely to the direction of movement and that the mask and the support are moved relative to each other with a speed which is dependent on the specific thickness of layer desired, or that the mask is moved with substantially constant velocity and the surface is exposed increasingly during the application.

Further, the method of application can be a vapor-deposition method.

The layer of low thermal conductivity can also be produced by drawing from a melt, the support with the resistance layer already applied to it being dipped vertically into the melt in such a manner that the edge, which upon the subsequent use of the apparatus is arranged opposite to the flow, faces downward.

Suitable materials for the layer of low thermal conductance are glass and plastics, particularly polytetrafluorethylene and polyimides. The support can consist of silicon, passivated metal or ceramics.

BRIEF DESCRIPTION OF THE DRAWINGS

With the above and other objects and advantages in view, the present invention will become more clearly understood in connection with the detailed description of preferred embodiments, when considered with the accompanying drawing, of which:

FIG. 1 shows a first embodiment in elevation and cross-sectional view;

FIG. 2 is a second embodiment, also shown in elevation and in cross-sectional view; and FIGS. 3 and 4 are schematic cross-sectional views of two devices which can be used in the manufacture of apparatus in accordance with the invention.

Identical parts are provided with the same reference numbers in the figures.

DETAILED DESCRIPTION OF THE PREFERRED EMBODIMENTS

The apparatus of the invention are shown on an enlarged scale in the figures. In general, the dimensions of such sensors are within the range of about 5 to 20 mm.

The apparatus of FIG. 1 has a flat support 1 which may consist in known manner of a ceramic material, for instance aluminum oxide or beryllium oxide. However, the use of silicon is also advantageously possible, in which case, for the production of the support 1 as well as for the application of the other layers, the methods developed for the production of electronic components are available. The use of a support 1 of metal may also be advantageous, in which case, however, the surface of the support 1 which faces the resistance layer must be passivated.

A resistance layer 2 which consists in known manner of a material with temperature-dependent electric conductivity is applied to the support 1. Further details of the resistance layer are not necessary for an understanding of the present invention and therefore are not described in detail.

Layers, 3, 4 of low thermal conductivity are applied over the resistance layer 2 as well as over the surface of the support 1 facing it. In this connection the thickness of the layers 3, 4 is in each case greatest at the edge of the apparatus facing the stream of air and decreases stepwise in the direction of the stream of air. In the apparatus shown in FIG. 1 this takes place in several steps. Such a layer can be applied, for instance, in the manner that a layer of the thickness such as shown at 5 is, first of all, applied by means of a printing process. Onto this layer there is imprinted another layer which, however, extends only up to the line designated 6, followed then by a layer which extends up to the line 7.

FIG. 2 shows an apparatus with continuously varying thickness of the layers 10 and 11. Such a layer can be produced, for instance, by moving a mask 12, shown in FIG. 3 and 4, over the surface of the resistance layer 2 or the support 1 upon the vapor deposition of the layer material. In this connection, the mask 12 can have a slit 13, as shown in FIG. 3. The differing layer thickness is obtained in this case by a different speed of movement of the mask 12 in the direction indicated by the arrow over the support.

In the apparatus shown in FIG. 4, a mask is moved in the direction indicated by the arrow during the vapor deposition process so that it exposes the surface increasingly during the application. Instead of moving of the mask the support could also be moved, which may result in advantages in the case of assembly-line manufacture.

I claim:

1. In an apparatus for measuring the velocity of flow of fluids, the apparatus having an electrically heatable resistance layer which is disposed in insulated manner on a support and is in thermal contact with a flowing fluid, the improvement comprising a thermal layer of low thermal conductivity material disposed on said resistance layer to produce a relationship of heat transfer between the flowing fluid and said resistance layer wherein the thermal conductivity of said thermal layer decrease in a direction of the flow of the fluid to substantially equalize a rate of heat transfer between the flowing fluid and the resistance layer along said resistance layer in the direction of flow.

2. The apparatus according to claim 1, wherein the layer of low thermal conductivity material is formed of glass.

3. The apparatus according to claim 1, wherein the layer of low thermal conductivity material is formed of plastic.

4. The apparatus according to claim 3, wherein the plastic is polytetrafluorethylene.

5. The apparatus according to claim 3, wherein the plastic is polyimide.

6. The apparatus according to claim 1, wherein the support is made of passivated metal.

7. The apparatus according to claim 1, wherein the support is made of ceramics.

8. In an apparatus for measuring the velocity of flow of fluids, the apparatus having an electrically heatable resistance layer which is disposed in insulated manner on a support and is in thermal contact with a flowing fluid, the improvement comprising a layer of low thermal conductivity material disposed on said resistance layer to produce a relationship of heat transfer between the flowing fluid and said resistance layer wherein the local heat transfer coefficient between the flowing fluid and the resistance layer with its support is at least approximately constant in a direction of the flow of the fluid; and wherein the thickness of the layer of low thermal conductivity decreases continuously in the direction of flow.

9. In an apparatus for measuring the velocity of flow of fluids, the apparatus having an electrically heatable resistance layer which is disposed in insulated manner on a support and is in thermal contact with a flowing fluid, the improvement comprising a layer of low thermal conductivity material disposed on said resistance layer to produce a relationship of heat transfer between the flowing fluid and said resistance layer wherein the local heat transfer coefficient between the flowing fluid and the resistance layer with its support is at least approximately constant in a direction of the flow of the fluid, and wherein the thickness of the layer of low thermal conductivity decreases stepwise in the direction of flow.

* * * * *